United States Patent
Huntington et al.

(10) Patent No.: US 6,785,808 B2
(45) Date of Patent: Aug. 31, 2004

(54) SYSTEM AND METHOD FOR ALTERING AN OPERATING SYSTEM START-UP SEQUENCE PRIOR TO OPERATING SYSTEM LOADING

(75) Inventors: Keith J. Huntington, Silver City, NC (US); Rex A. Flynn, Newton, MA (US)

(73) Assignee: Insyde Software, Inc., Southborough, MA (US)

( * ) Notice: Subject to any disclaimer, the term of this patent is extended or adjusted under 35 U.S.C. 154(b) by 638 days.

(21) Appl. No.: 09/775,473

(22) Filed: Feb. 2, 2001

(65) Prior Publication Data

US 2001/0047472 A1 Nov. 29, 2001

Related U.S. Application Data

(60) Provisional application No. 60/180,300, filed on Feb. 4, 2000.

(51) Int. Cl.$^7$ ............................................... G06F 9/445
(52) U.S. Cl. ................... 713/2; 713/1; 713/2; 713/100; 710/8; 710/10; 710/104
(58) Field of Search .............................. 713/1, 2, 100; 710/8, 10, 104

(56) References Cited

U.S. PATENT DOCUMENTS

| | | | | |
|---|---|---|---|---|
| 5,134,580 A | * | 7/1992 | Bertram et al. ................. | 713/1 |
| 5,627,964 A | | 5/1997 | Reynolds et al. ...... | 395/183.22 |
| 5,822,582 A | | 10/1998 | Doragh et al. .............. | 395/652 |
| 5,826,012 A | * | 10/1998 | Lettvin ....................... | 713/200 |
| 5,884,073 A | * | 3/1999 | Dent .............................. | 713/2 |
| 6,003,131 A | * | 12/1999 | Lee et al. ...................... | 713/2 |
| 6,009,520 A | * | 12/1999 | Gharda ........................... | 713/1 |
| 6,334,149 B1 | * | 12/2001 | Davis et al. ................. | 709/219 |
| 6,499,102 B1 | * | 12/2002 | Ewertz ........................... | 713/1 |
| 6,519,659 B1 | * | 2/2003 | Stevens ....................... | 710/15 |
| 6,560,702 B1 | * | 5/2003 | Gharda et al. ................. | 713/2 |
| 6,564,318 B1 | * | 5/2003 | Gharda et al. ................. | 713/2 |
| 6,711,675 B1 | * | 3/2004 | Spiegel et al. ................. | 713/2 |
| 2001/0056509 A1 | * | 12/2001 | Iwata ........................... | 710/20 |

FOREIGN PATENT DOCUMENTS

| | | |
|---|---|---|
| EP | 0 448 497 A2 | 9/1991 |
| EP | 0 907 124 A1 | 4/1999 |
| GB | 2 336 921 A | 11/1999 |

OTHER PUBLICATIONS

Wolking, G et al. "Restoring DOS After Upgrading to win 95" PC Magazine, Online Mar. 25, 1997.

* cited by examiner

*Primary Examiner*—Lynne H. Browne
*Assistant Examiner*—Nitin C Patel
(74) *Attorney, Agent, or Firm*—Lahive & Cockfield, LLP

(57) ABSTRACT

A method for altering the start-up sequence of an operating system prior to loading the operating system is disclosed. The method allows changes to be made to the start-up sequence of processes and applications initiated by the operating system based upon the occurrence of a designated event during the BIOS boot sequence. In this manner, events occurring prior to operating system loading affect the operating system start-up sequence. Similarly, the illustrative embodiment of the present invention may, during the period of time the operating system is operating, write instructions which control the sequence of events taking place during the subsequent BIOS boot sequence.

39 Claims, 3 Drawing Sheets

SYSTEM AND METHOD FOR ALTERING AN OPERATING SYSTEM START-UP SEQUENCE PRIOR TO OPERATING SYSTEM LOADING

This application claims the benefit of priority under 35 U.S.C. 119(e) to U.S. provisional application Serial No. 60/180,300, filed Feb. 4, 2000.

TECHNICAL FIELD

The present invention relates generally to the altering of an operating system start-up sequence in a computer system or electronic device. More particularly, the present invention relates to the altering of an operating system start-up sequence prior to the loading of the operating system.

BACKGROUND OF THE INVENTION

The "boot sequence" of a computer is generally executed when power is first applied to the computer. The boot sequence may also be initiated when the computer is instructed to return to operation when the user reboots the computer. The boot sequence is controlled by the Basic Input Output System (BIOS) of the computer. The BIOS typically resides in Read Only Memory (ROM). The BIOS performs a sequence of steps prior to transferring control of system resources to the operating system. One of the steps performed by BIOS during this initial time period is a "Power On Self Test", also known as "POST". The POST checks that various computer parts such as the keyboard, power supply, system board, system memory, memory modules controllers, graphic system, diskette drives and hard drives are functioning properly. Following the completion of the POST, conventional computers load an operating system, or pieces thereof, into memory and then transfer control of the computer to the operating system. Electronic devices containing an operating system and a BIOS also follow this same sequence of events to begin operation, even though the components in the electronic devices may be different from the components found in a computer.

The selection of what applications to load and the order in which the applications are loaded by the operating system ("the start-up sequence") is determined by examining one or more start-up data structures maintained by the operating system. Although the applications to be started, and the order in which the applications are started, may be altered, conventional methods of doing so are cumbersome and/or error-prone procedures that require careful editing of the start-up data structures. Also, since start-up data structures are maintained by the operating system, it is difficult to alter them without the operating system being loaded. As a result, it is not practical using conventional methods to condition the list of start-up applications on transient events occurring during the boot sequence. Thus, in a conventional computer system or electronic device utilizing an operating system with BIOS, the list of start-up applications is generally changed once the operating system has already been loaded into memory.

SUMMARY OF THE INVENTION

The illustrative embodiment of the present invention provides a method for altering the start-up sequence of an operating system prior to the loading of the operating system. The method enables changes to be made to the start-up sequence of processes and applications initiated by the operating system based upon the occurrence of a designated event during the BIOS boot sequence. An application is initiated during BIOS to check for the occurrence of the designated event. Upon the occurrence of the designated event, the application writes instructions altering the operating system start-up sequence to a storage area accessible to the operating system. After the completion of the BIOS boot sequence, the BIOS loads the operating system. The operating system launches a second application which immediately checks a storage area to see if the storage area contains instructions to alter the start-up sequence and proceeds accordingly. If the start-up sequence has been changed, the new start-up sequence is used; otherwise an existing start-up sequence is executed. The second application also may write instructions to a storage area accessible to the first application designating a particular event to be checked during the next BIOS boot sequence. In this manner, events occurring prior to operating system loading affect the operating system start up sequence. Similarly, an application executed by the operating system may write instructions directing the procedures carried out during the subsequent BIOS boot sequence.

In one embodiment of the present invention, a method is provided for use with a computer system to alter the operating system start-up sequence during the BIOS boot sequence. This altering of the operating system start-up sequence occurs prior to loading of the operating system. An application is initiated by the BIOS and retrieves instructions from a storage area. The instructions direct the application to look for the occurrence of an event during the BIOS boot sequence. Upon occurrence of the event, the application may write instructions to another storage area which alter the start-up sequence of the operating system. The application then terminates and the BIOS loads the operating system. Prior to beginning the start-up sequence, the operating system initiates an application that checks a storage area for instructions altering the start-up sequence of the operating system. If the instructions are found, a new start-up sequence for the operating system is conducted. If the instructions are not found, the operating system executes the existing start-up sequence. The application launched by the operating system also may write instructions to the storage area accessed by the BIOS-launched application in order to designate a particular event as the conditional trigger to alter the operating system start-up sequence.

In a different embodiment of the present invention, a method is provided for use with an electronic device to alter the operating system start-up sequence during the BIOS boot sequence. This altering of the start-up sequence occurs prior to loading the operating system. An application is initiated by the BIOS and retrieves instructions from a storage area. The instructions direct the application to look for the occurrence of a particular event during the BIOS boot sequence. Upon occurrence of the particular event, the application may write instructions to another storage area which alter the start-up sequence of the operating system. The application then terminates and the BIOS loads the operating system. Prior to beginning its start-up sequence, the operating system initiates an application which checks the specific storage area for instructions altering the start-up sequence of the operating system. If the instructions are found, a new start-up sequence for the operating system is conducted. If the instructions are not found, the operating system executes its existing start-up sequence. The application launched by the operating system also may write instructions to the storage area accessed by the BIOS-launched application in order to designate a particular event as the conditional trigger to alter the operating system start-up sequence.

DETAILED DESCRIPTION OF THE INVENTION

The illustrative embodiment of the present invention provides a method for altering the start-up sequence of an operating system prior to the operating system loading. The method allows changes to be made to the start-up sequence of processes and applications initiated by the operating system based upon the occurrence of a designated event during the BIOS boot sequence. In this manner, events occurring prior to operating system loading affect the operating system start-up sequence. Similarly, the illustrative embodiment of the present invention may, during the period of time the operating system is operating, write instructions which control the sequence of events taking place during the subsequent BIOS boot sequence.

The illustrative embodiment of the present invention may alter the normal operating system start-up sequence by establishing communication between two non-contemporaneous utilities: a product player that executes during the boot sequence, and a product controller that executes during the operation of the operating system. This communication occurs by data being written and read to a predetermined storage location that is accessible to both the product player and the product controller. The communication between the two utilities enables run-time decisions to be made regarding the operating system start-up sequence.

Figure 1:
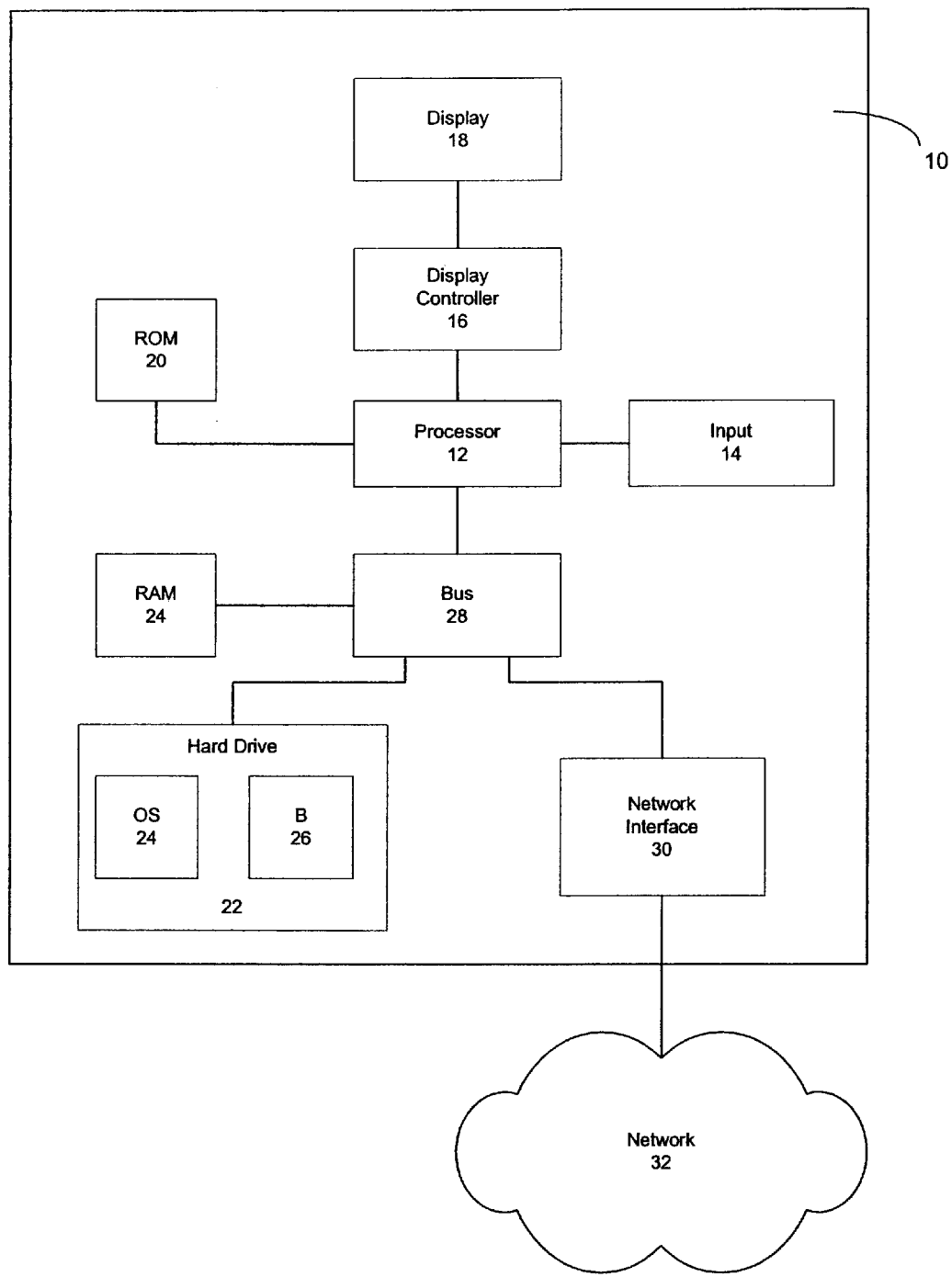
FIG. 1 is a block diagram of an electronic device suitable for practicing the illustrative embodiment.

FIG. 1 depicts a suitable environment in which to practice the illustrative embodiment of the present invention. The present invention may be practiced in an electronic device 10 such as certain types of telephones and pagers, palm top devices, PDAs, internet appliances and the like, or in a computer system. The electronic device 10 includes a processor 12 in communication with an input device 14, such as a keyboard, and a display controller 16. The display controller 16 is connected to, and controls the operation of, a display 18 or other output device. The electronic device 10 further includes various memory units for storage of instructions to be executed by the processor 12. One type of memory units is Flash Read Only Memory (ROM) 20 for non-volatile storage of small amounts of infrequently changed data. Another type is a non-volatile storage medium such as a hard drive 22, for storage of large amounts of frequently changed data. Alternately, Random Access Memory (RAM) 24 is used for volatile storage of data that must be quickly accessible to the processor 12. Volatile memory loses its data when the electronic device 10 is powered down. Non-volatile memory retains its data when the electronic device 10 is powered down and the data is available when power is returned to the electronic device. The memory unit used for high capacity storage of instructions is most typically a hard drive 22. However, other types of memory devices, such as flash ROM, may be used in place of the hard drive 22. Moreover, the hard drive 22 or other non-volatile storage mediums need not be physically proximate to the other components of the electronic device 10 but can instead be accessible over a network 32.

The hard drive 22 provides storage for software instructions, including an operating system 25 and a browser 26. The hard drive 22 and RAM 24 are generally in communication with the processor 12 over a bus 28. The bus 28 is also in communication with a network interface 30 which provides access to a network 32. The ROM 20, which holds instructions for execution of the boot sequence provided by the BIOS, is in direct communication with the processor 12. Additionally, the BIOS stored on the ROM 20 is able to access the hard drive 22 during the boot sequence using system calls. Those skilled in the art will realize that there are many possible component configurations used by electronic devices and that the present invention is not restricted to the configuration depicted in FIG. 1.

Figure 2:
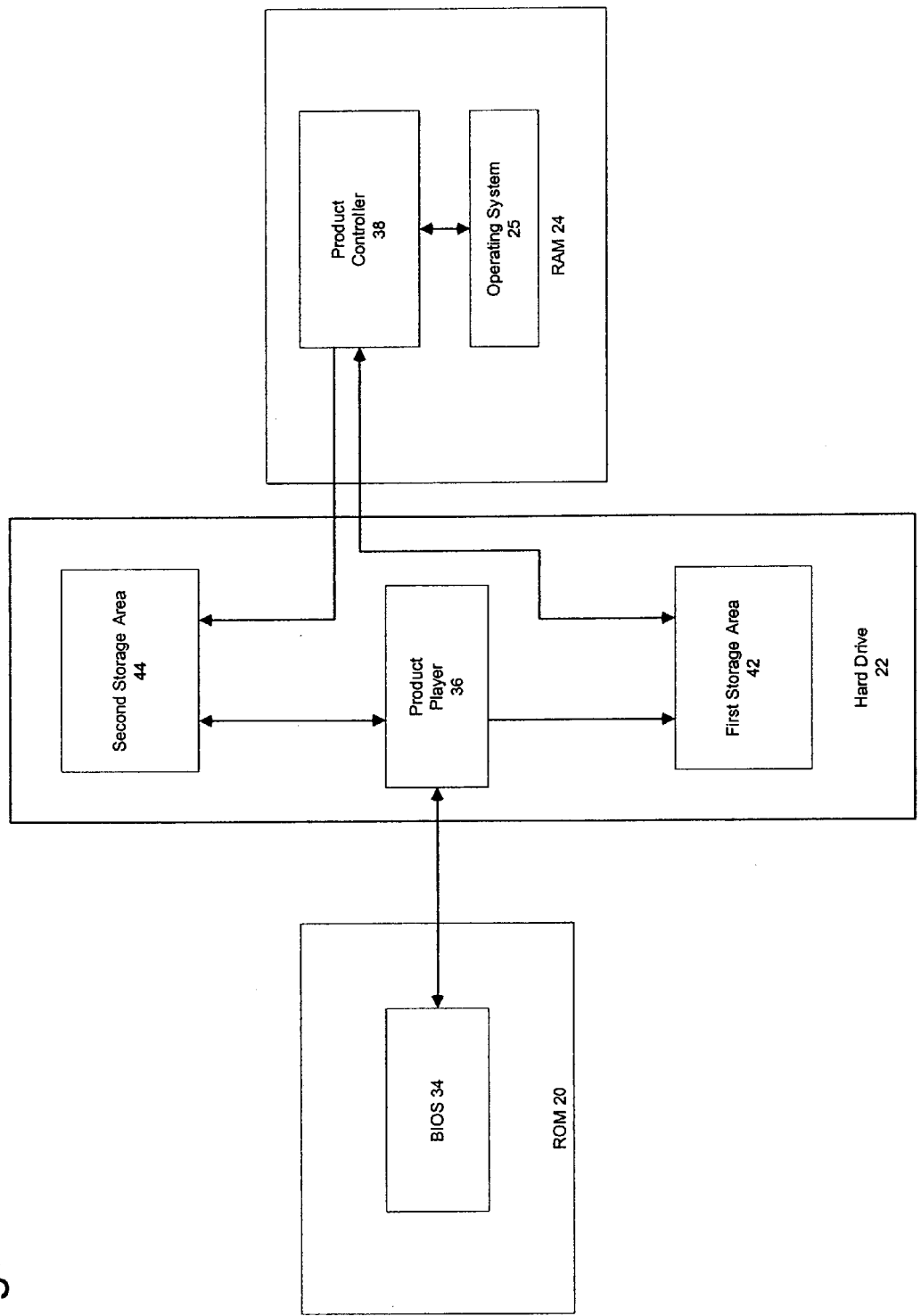
FIG. 2 depicts a block diagram of components contained in the electronic device of FIG. 1.

Referring now to FIG. 2, the ROM 20 provides storage for the BIOS 34. The product controller 38, applications 40, and at least part of the operating system 25, are moved to RAM 24 from the hard drive 22 for execution when the boot sequence ends. The product player 36 and the product controller 38, both of which are typically implemented as a sequence of computer-executable instructions, cooperate to provide for the exchange of data. This exchange occurs by way of mutually agreed upon first and second storage areas 42, 44 that are in communication with both the product player 36 and the product controller 38.

The product player 36 and the first and second storage areas 42 and 44 are stored in non-volatile storage mediums. The implementation for the non-volatile storage mediums depends upon the exact hardware configuration as well as the embodiment of this invention. The non-volatile storage mediums may be located within the location used by the file system managed by the Operating System on the hard drive 22. Alternatively, the non-volatile storage medium used may be located in unused sectors of a hard disk drive. Such unused sectors are a well known artifact of hard drives partitioned with DOS. The non-volatile storage medium used may also be located in an Extended BIOS Data Area (EBDA) which is part of the RAM 24. Additional embodiments of the non-volatile storage medium used in the illustrative embodiment of the present invention include OEM specific Electrically Erasable Programmable Read Only Memory (EEPROM), Complementary Metal Oxide Semiconductor (CMOS) and Extended Complementary Metal Oxide Semiconductor (ECMOS). EEPROM is a type of ROM that is erasable under certain conditions. CMOS and ECMOS are small pieces of RAM holding configuration information for the electronic device 10. CMOS (or ECMOS) are connected to a battery or capacitor. Because CMOS (or ECMOS) is connected to an independent energy source, the information is not lost when the computer or electronic device is powered down, and it may therefore be categorized as a quasi non-volatile storage medium. Unfortunately, should something happen to the energy source for the CMOS (or ECMOS) the contents stored therein are lost, unlike information held in ROM and EEPROM. Those skilled in the art will recognize that there are many different non-volatile storage mediums that may be utilized by the illustrative embodiment of the present invention.

In this embodiment, the product player 36, the second storage area 44, and a portion of the first storage area 42 are stored within the location used by the file system managed by the operating system on the hard drive 22. The remainder of the first storage area 42 is stored in unused sectors on the hard drive 22. BIOS system calls are used to access the product player 36 and the first and second storage areas 42, 44 during the boot sequence. In other embodiments, the product player 36 may be split between different non-volatile storage areas. Those skilled in the art will realize that the product player 36 and the first and second storage areas 42, 44 need not be located within the same non-volatile storage medium but rather may be located within different non-volatile storage mediums. In an alternate embodiment, a portion of the product player 36 is located in ROM 20 and the remainder in a separate removable non-volatile storage medium.

Figure 3:
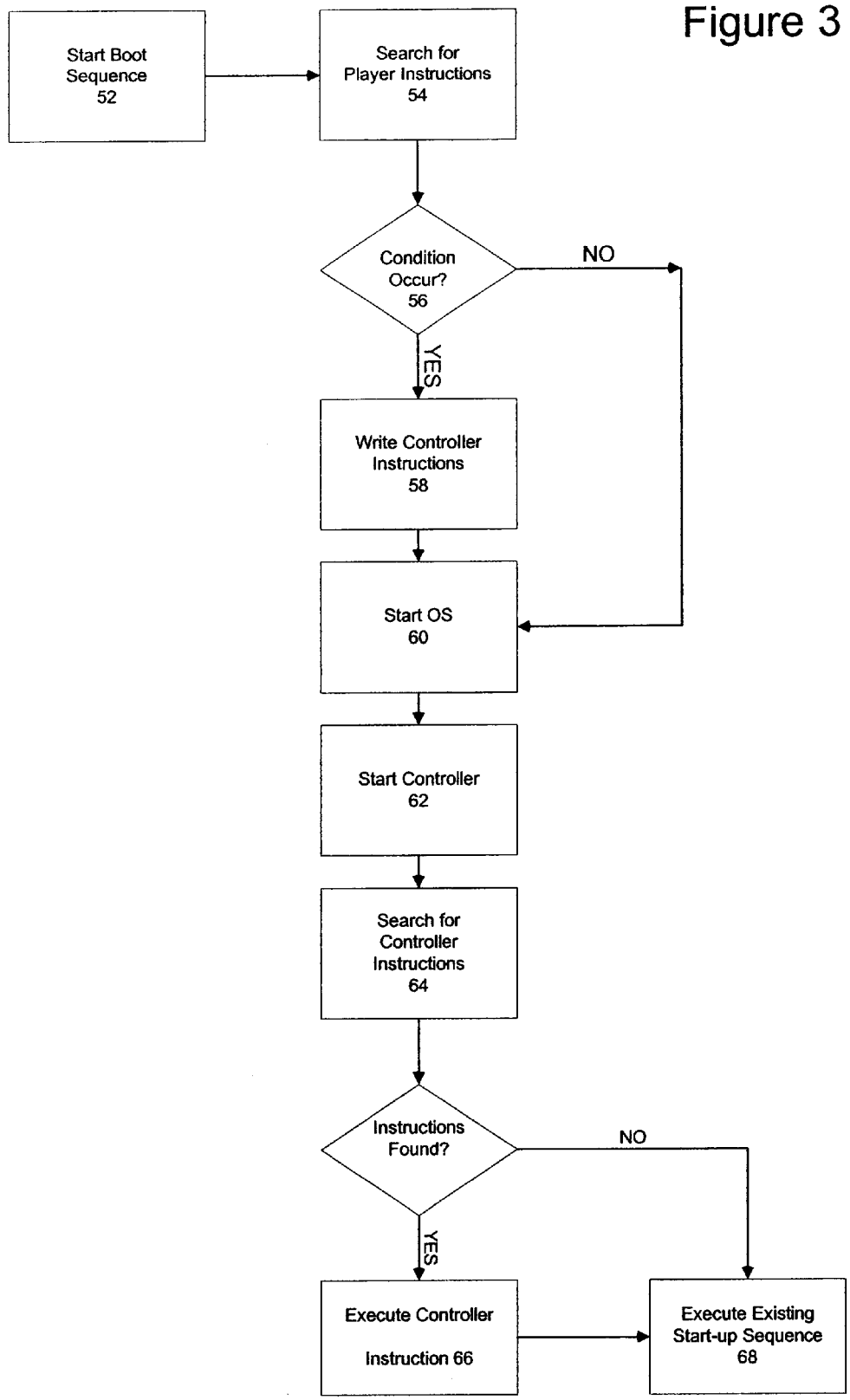
FIG. 3 is a flow chart overview of the steps involved in the alteration of the operating system start-up sequence.

FIG. 3 summarizes the steps by which the player, running during the boot sequence, alters the start-up sequence of the operating system. The method begins with the step of initiating the boot sequence (step 52), either through powering up the computer or through rebooting the computer. At some time during the boot sequence, the player searches for instructions in the second storage element (step 54). These instructions may apprise the player of a condition to be checked for during the boot sequence. Assuming it finds instructions in the second storage element, the player checks for the occurrence of the condition (step 56). If the condition does not occur before the end of the boot sequence, the player takes no further action. Alternatively, if the player detects the occurrence of the condition, the player writes appropriate instructions to the first storage element (step 58). At the end of the boot sequence, the operating system execution begins (step 60). Prior to beginning the operating system start-up sequence, the operating system starts the product controller 38 (step 62). The product controller 38 checks the first storage element 42 to determine if any instructions were written there by the product player 36 (step 64). If there are no instructions in the first storage element 42, the controller does not start any applications and the operating system reverts to its existing start-up sequence (step 68). If there are instructions, the product controller 38 proceeds to execute those instructions (step 66).

The foregoing procedure provides a mechanism through which an event occurring during the boot sequence, such as a user response to a query, alters the following operating system 25 start-up sequence. Those skilled in the art will realize that the triggering event may be something other than user input. For example, the product controller 38 may write instructions to be read by the product player 36 causing the player to check the current system date of the computer or electronic device. Depending on the particular date, the product player 36 may write alternate instructions to be later read by the product controller 38 which alter the start-up sequence. The foregoing procedure thus enables software running outside the operating system to extend its influence into the operating system. The extension of this influence is achieved by leaving instructions at a predetermined first storage area 42 for later retrieval and execution by software running within the operating system. The BIOS-initiated application reads from the second storage area 44 and writes to the first storage area 42. The operating system-initiated application reads from the first storage area 42 and writes to the second storage area 44.

In a typical scenario, the product player 36 may ask the user if he would like to see the value of his portfolio. If the answer is yes, the product player 36 writes appropriate instructions to the first storage element 42. If the answer is no, the product player 36 does nothing. When the operating system 25 starts, it initiates execution of the product controller 38. The product controller 38 checks the first storage element 42 to determine if the product player 36 wrote any instructions. If the product controller 38 identifies such instructions, it starts an application 40, such as a browser 26, and provides the browser 26 with information required to display the web page containing the value of the user's portfolio.

The application 40 in the foregoing example may not be among the applications in the normal start-up sequence executed by the operating system in the absence of intervention by the product controller 38. Alternatively, the application 40 may be in the normal start-up sequence but, in the absence of intervention by the product controller 38, the application would open in a state other than that specified by the product controller 38, or be executed in a different position in the start-up sequence.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. Practitioners of the art will realize that the sequence of steps depicted in the figures may be altered without departing from the scope of the present invention and that the illustrations contained herein are singular examples of a multitude of possible depictions of the present invention.

We claim:

1. In a computer system, said system including an operating system and a Basic Input Output System (BIOS) that provides a boot sequence for the computer system, a method for altering a start-up sequence of applications and processes initiated by the operating system, said method comprising the steps of:

providing a first application and second application stored in persistent storage mediums, said first application and said second application being separate from said BIOS, wherein said first application is initiated by the BIOS and said second application is initiated by said operating system;

providing a first and second storage area in persistent storage mediums for storing computer-executable instructions, said computer-executable instructions being written to said first storage area by said first application during the boot sequence provided by the BIOS upon the detection of the occurrence of an event specified by computer-executable instructions retrieved from said second storage area by said first application, said occurrence of an event to be detected during said boot sequence;

retrieving said computer-executable instructions from said first storage area using said second application;

executing the computer-executable instructions retrieved from said first storage area using said second application, said executing of the instructions being retrieved from the first storage area using the second application taking place following completion of said boot sequence, said computer-executable instructions altering the start-up sequence of applications and processes initiated by said operating system; and writing said computer-executable instructions to said second storage area using said second application, said computer-executable instructions specifying the occurrence of an event to be detected during a subsequently performed boot sequence.

2. The method of claim 1 wherein said first and second storage areas are in an Extended BIOS Data Area (EBDA).

3. The method of claim 1 wherein said first and second storage areas are in unused sectors of a partitioned hard drive.

4. The method of claim 1 comprising the further step of:
locating said first and second storage areas within the location used for the file system managed by the Operating System.

5. The method of claim 1 comprising the further step of:
locating said first application within the location used for the file system managed by the Operating System.

6. The method of claim 1 comprising the further step of:
locating at least a portion of said first application within ROM and the remaining portion in a separate non-volatile storage medium.

7. The method of claim 1 wherein said first storage area is in EEPROM.

8. The method of claim 1 wherein said first storage area is in CMOS.

9. The method of claim 1 wherein said first storage area is in ECMOS.

10. The method of claim 1 wherein said first and second applications are not stored in the same persistent storage medium as said first and second storage areas.

11. The method of claim 1 wherein said first and second storage areas are located in different persistent storage mediums.

12. The method of claim 1 further comprising the step of:
altering the start-up sequence by initiating an application or process that was not previously part of the start-up sequence in response to said second application executing said computer-executable instructions retrieved from said first storage area.

13. The method of claim 1 wherein the altering of the start-up sequence is accomplished by rearranging the order in which processes and applications that are already included in the start-up sequence are initiated.

14. The method of claim 1 wherein said specified event is a user entering specific input.

15. The method of claim 1 wherein said specified event is the occurrence of said boot sequence.

16. In an electronic device, said electronic device including an operating system and a Basic Input Output System (BIOS) that provides a boot sequence for the electronic device, a method for altering a start-up sequence of applications and processes initiated by said operating system, said method comprising the steps of:
providing a first application and second application stored in persistent storage mediums, said first application and said second application being separate from said BIOS, wherein said first application is initiated by the BIOS and said second application is initiated by said operating system;
providing a first and second storage area in persistent storage mediums for storing computer-executable instructions, said computer-executable instructions being written to said first storage area by said first application during the boot sequence provided by the BIOS upon the detection of the occurrence of an event specified by computer-executable instructions retrieved from said second storage area by said first application, said occurrence of an event to be detected during said boot sequence;
retrieving said computer-executable instructions from said first storage area using said second application;
executing the computer-executable instructions retrieved from said first storage area using said second application, said executing of the instructions being retrieved from the first storage area using the second application taking place following completion of said boot sequence, said computer-executable instructions altering the start-up sequence of applications and processes initiated by said operating system; and
writing said computer-executable instructions to said second storage area using said second application, said computer-executable instructions specifying the occurrence of an event to be detected during a subsequently performed boot sequence.

17. The method of claim 16 wherein said first and second storage areas are in the Extended BIOS Data Area (EBDA).

18. The method of claim 16 wherein said first and second storage areas are in unused sectors of a partitioned hard drive.

19. The method of claim 16 comprising the further step of:
locating said first and second storage areas within the location used for the file system managed by the Operating System.

20. The method of claim 16 comprising the further step of:
locating said first application within the location used for the file system managed by the Operating System.

21. The method of claim 16 comprising the further step of:
locating at least a portion of said first application within ROM and the remaining portion in a separate non-volatile storage medium.

22. The method of claim 16 wherein said first storage area is in EEPROM.

23. The method of claim 16 wherein said first storage area is in CMOS.

24. The method of claim 16 wherein said first storage area is in ECMOS.

25. The method of claim 16 wherein said first and second applications are not stored in the same persistent storage medium as said first and second storage areas.

26. The method of claim 16 wherein said first and second storage areas are located in different persistent storage mediums.

27. The method of claim 16 further comprising the step of:
altering said start-up sequence by initiating an application or process that was not previously part of said start-up sequence in response to said second application executing said computer-executable instructions retrieved from said first storage area.

28. The method of claim 16 wherein the altering of said start-up sequence is accomplished by rearranging the order in which processes and applications that are already included in the start-up sequence are initiated.

29. The method of claim 16 wherein said specified event is a user entering specific input.

30. The method of claim 16 wherein said specified event is the occurrence of said boot sequence.

31. A medium for use with a computer system, said system including an operating system and a Basic Input Output System (BIOS), said medium holding computer-executable instructions for a method, said method comprising the steps of:
providing a first application and second application stored in persistent storage mediums, said first application and said second application being separate from said BIOS, wherein said first application is initiated by the BIOS and said second application is initiated by said operating system;
providing a first and second storage area in persistent storage mediums for storing computer-executable instructions, said computer-executable instructions being written to said first storage area by said first application during the boot sequence provided by the BIOS upon the detection of the occurrence of an event specified by computer-executable instructions retrieved from said second storage area by said first application, said occurrence of an event to be detected during said boot sequence;
retrieving said computer-executable instructions from said first storage area using said second application;
executing said the computer-executable instructions retrieved from said first storage area using said second application, said executing of the instructions being retrieved from the first storage area using the second application taking place following completion of said boot sequence, said computer-executable instructions altering the start-up sequence of applications and processes initiated by said operating system; and writing said computer-executable instructions to said second storage area using said second application, said computer-executable instructions specifying the occurrence of an event to be detected during a subsequently performed boot sequence.

32. The medium of claim 31, said method further comprising the step of:

altering said start-up sequence by initiating an application or process that was not previously part of said start-up sequence in response to said second application executing said computer-executable instructions retrieved from said first storage area.

33. The medium of claim 31, said method further comprising the step of:

altering said start-up sequence by rearranging the order in which processes and applications that are already included in the start-up sequence are initiated.

34. A medium for use with an electronic device, said electronic device including an operating system and a Basic Input Output System (BIOS), said medium holding computer-executable instructions for a method, said method comprising the steps of:

providing a first application and second application stored in persistent storage mediums, said first application and said second application being separate from said BIOS, wherein said first application is initiated by the BIOS and said second application is initiated by said operating system;

providing a first and second storage area in persistent storage mediums for storing computer-executable instructions, said computer-executable instructions being written to said first storage area by said first application during the boot sequence provided by the BIOS upon the detection of the occurrence of an event specified by computer-executable instructions retrieved from said second storage area by said first application, said occurrence of an event to be detected during said boot sequence;

retrieving said computer-executable instructions from said first storage area using said second application;

executing the computer-executable instructions retrieved from said first storage area using said second application, said executing of the instructions being retrieved from the first storage area using the second application taking place following completion of said boot sequence, said computer-executable instructions altering the start-up sequence of applications and processes initiated by said operating system; and writing said computer-executable instructions to said second storage area using said second application, said computer-executable instructions specifying the occurrence of an event to be detected during a subsequently performed boot sequence.

35. The medium of claim 34, said method further comprising the step of:

altering said start-up sequence by initiating an application or process that was not previously part of said start-up sequence in response to said second application executing said computer-executable instructions retrieved from said first storage area.

36. The medium of claim 34, said method further comprising the step of:

altering said start-up sequence by rearranging the order in which processes and applications that are already included in the start-up sequence are initiated.

37. In an electronic device having an operating system and a Basic Input Output System (BIOS) that provides a boot sequence for the computer system, a system, comprising:

at least one persistent storage medium, holding a first and second storage area for holding computer-executable instructions;

a first application which is separate from said BIOS and is initiated by said BIOS, said first application writing instructions to said first storage area upon the occurrence of an event specified by computer-executable instructions retrieved by said first application from said second storage area, said event occurrence detected during said boot sequence; and a second application which is separate from said BIOS and which is initiated by said operating system, said second application retrieving and executing computer-executable instructions from said first storage area, said executing of the instructions retrieved from the first storage area taking place following completion of said boot sequence, said computer-executable instructions altering the start-up sequence of applications and processes initiated by said operating system.

38. The system of claim 37 wherein said second application writes computer-executable instructions to said second storage area, said computer-executable instructions identifying the occurrence of an event during a subsequently performed boot sequence.

39. The system of claim 37 wherein the altering of the start up sequence performed by the operating system includes the initiating of one of an application and process not previously part of the operating system start up sequence.

* * * * *